(12) United States Patent
Taoka et al.

(10) Patent No.: US 10,970,817 B2
(45) Date of Patent: Apr. 6, 2021

(54) IMAGE MAGNIFYING APPARATUS

(71) Applicant: Samsung Electronics Co., Ltd., Suwon-si (KR)

(72) Inventors: Mineki Taoka, Yokohama (JP); Shintaro Okada, Yokohama (JP)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 167 days.

(21) Appl. No.: 16/232,388

(22) Filed: Dec. 26, 2018

(65) Prior Publication Data

US 2019/0206025 A1   Jul. 4, 2019

(30) Foreign Application Priority Data

Dec. 28, 2017 (JP) .............................. JP2017-254328
Aug. 2, 2018 (KR) ........................ 10-2018-0090522

(51) Int. Cl.
*G06T 3/40* (2006.01)
*G06T 5/40* (2006.01)
*G06T 5/00* (2006.01)

(52) U.S. Cl.
CPC .......... *G06T 3/4007* (2013.01); *G06T 3/4061* (2013.01); *G06T 5/003* (2013.01); *G06T 5/40* (2013.01); *G06T 2207/20004* (2013.01)

(58) Field of Classification Search
CPC ......... G06T 2207/20004; G06T 3/4007; G06T 3/4061; G06T 5/003
See application file for complete search history.

(56) References Cited

U.S. PATENT DOCUMENTS

| 5,917,963 A * | 6/1999 | Miyake ................. G06T 3/4007 358/3.07 |
| 2011/0063515 A1 | 3/2011 | Kobayashi |
| 2015/0213585 A1* | 7/2015 | Kitashou ............... G06T 3/4007 345/609 |

FOREIGN PATENT DOCUMENTS

JP          2011-181105 A       9/2011

* cited by examiner

*Primary Examiner* — Ross Varndell
(74) *Attorney, Agent, or Firm* — Harness, Dickey & Pierce, P.L.C.

(57) ABSTRACT

An image magnifying apparatus includes a processor configured to execute non-transitory machine readable instructions to configure the processor to, receive the image data, generate a first interpolation pixel between pixels of the image data, by applying a first interpolation method based on a high-band spectrum of the image data, generate a second interpolation pixel between pixels of the image data, by applying a second interpolation method not based on the high-band spectrum of the image data, identify a pattern of pixels of the image data by extracting peripheral pixels of an interpolation object position in the image data, select whether to apply the first interpolation method to the interpolation object position or whether to apply the second interpolation method to the interpolation object position, and output one of the first interpolation pixel and the second interpolation pixel, as an output interpolation pixel, based on the selection.

9 Claims, 17 Drawing Sheets

IMAGE MAGNIFYING APPARATUS

CROSS-REFERENCE TO RELATED APPLICATION(S)

This application claims benefit of priorities to Japan Patent Application No. 2017-254328 filed on Dec. 28, 2017 in the Japan Intellectual Property Office and to Korean Patent Application No. 10-2018-0090522 filed on Aug. 2, 2018 in the Korean Intellectual Property Office, the disclosures of each of which are incorporated herein by reference in their entirety.

BACKGROUND

Inventive concepts relates to an image magnifying apparatus.

According to the increasing use of high-resolution imaging devices, a technique of magnifying a low-resolution video to a high-resolution video is desired. To magnify a low-resolution video to a high-resolution video, an imaging device includes an image magnifying apparatus for interpolating and outputting a pixel of an image. The image magnifying apparatus magnifies and outputs an input image by applying a process for interpolating pixels in the image.

SUMMARY

An aspect of inventive concepts is to provide an image magnifying apparatus capable of selecting and applying an interpolation method according to local characteristics of an input image.

According to an example embodiment of inventive concepts, an image magnifying apparatus a processor configured to execute non-transitory machine readable instructions to configure the processor to, receive the image data, generate a first interpolation pixel between pixels of the image data, by applying a first interpolation method based on a high-band spectrum of the image data, generate a second interpolation pixel between pixels of the image data, by applying a second interpolation method not based on the high-band spectrum of the image data, identify a pattern of pixels of the image data by extracting peripheral pixels of an interpolation object position in the image data, select whether to apply the first interpolation method to the interpolation object position or whether to apply the second interpolation method to the interpolation object position, and output one of the first interpolation pixel and the second interpolation pixel, as an output interpolation pixel, based on the selection.

BRIEF DESCRIPTION OF DRAWINGS

The above and other aspects, features, and other advantages of the inventive concepts will be more clearly understood from the following detailed description, taken in conjunction with the accompanying drawings, in which.

DETAILED DESCRIPTION OF EXAMPLE EMBODIMENTS

Figure 1:
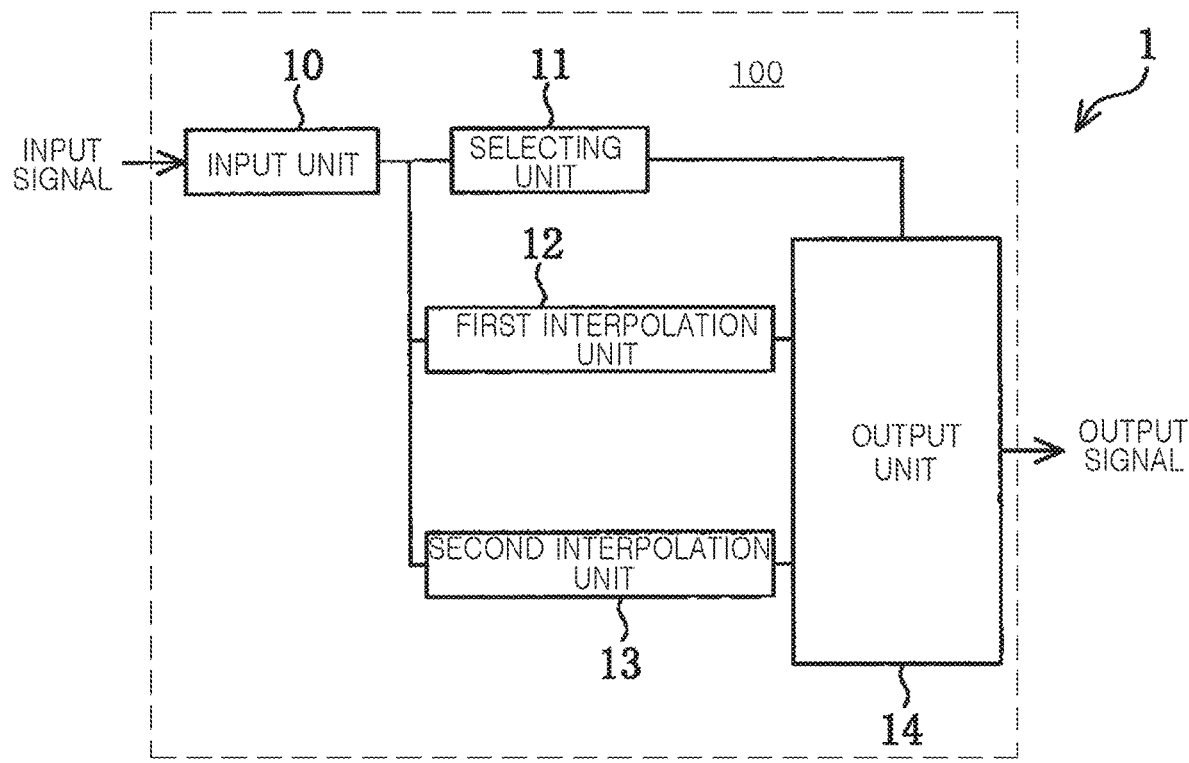
FIG. 1 is a block diagram illustrating a configuration of an image magnifying apparatus according to some example embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

Units and/or devices according to one or more example embodiments may be implemented using hardware, a combination of hardware and software implemented in some form of hardware (e.g., a processor, ASIC, etc.), or storage media storing software. Hardware may be implemented using processing circuitry such as, but not limited to, one or more processors, one or more Central Processing Units (CPUs), one or more Graphics Processing Units (GPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, GPUs, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

When a natural image, e.g. a still-life image or an image of nature, is input to an image magnifying apparatus as an image, an interpolation method suitable for a natural image is applied. The interpolation method suitable for the natural image may be an interpolation method emphasizing a change in waveform/frequency of an input signal. Thus, an image may be sharpened, and a bokeh/blur phenomenon, which may occur during magnification of an image, may be reduced. Meanwhile, a graphic image, e.g. an image having a sharpened edge, may be input to an image magnifying apparatus. In this case, when an interpolation method emphasizing a change in waveform/frequency of an input signal is applied, an output image may become unnatural; for example, ringing in an edge portion may occur. A graphic image having a sharpened edge may include, for example, an image including a caption such as a character, an image of a PC, and/or the like. Applying an interpolation method not emphasizing a change in waveform/frequency of an input signal to the graphic image may be preferable.

An image magnifying apparatus may change an interpolation method based on a histogram of an input image. Thus, while a bokeh/blur phenomenon which may occur during magnification is suppressed in a natural image, image quality deterioration caused by interpolation may be suppressed in a graphic image. However, in this case, when both a natural image and a graphic image are provided simultaneously in a single image, sufficiently distinguishing the natural image and the graphic image may be difficult. Thus, an optimal interpolation method may not be applied to an area of each image. Moreover, a boundary between a natural image and a graphic image may become unnatural.

In addition, if a constant weave grid, a constant pattern such as a character, an acnode/isolated point, and/or the like are included in an image, when an interpolation method suitable for a natural image is applied to an area, a pattern may not be correctly magnified. Thus, proposing an image magnifying apparatus capable of selecting an interpolation method suitable for an image is desired.

Hereinafter, the example embodiments of the present disclosure will be described in detail with reference to the attached drawings. As used below in the figures, the image magnifying apparatus 1 and/or the image magnifying apparatus 20 may be implemented in or may include hardware, such as a central processing unit (CPU) or processor 100. The image magnifying apparatus 1 and the image magnifying apparatus 20 may include a processor 100 configured to execute machine-readable instructions stored in a storage medium, such as a memory (not shown). Each component, or at least some of the components, of the image magnifying apparatus 1 and the image magnifying apparatus 20 illustrated in the figures may be implemented in hardware such as firmware, or in hardware executing software. Each component, or at least some of the components, of the image magnifying apparatus 1 and the image magnifying apparatus 20 illustrated in the figures may correspond to a set of machine-readable instructions such that, when executed on a computer, cause the computer to perform the corresponding actions described below. When used below, "a processor" may correspond to one processor, or a plurality of processors. Each such component in the figures may correspond to instructions executed by at least one processor. Each such component may correspond to instructions executed by at least one processor.

Figure 2:
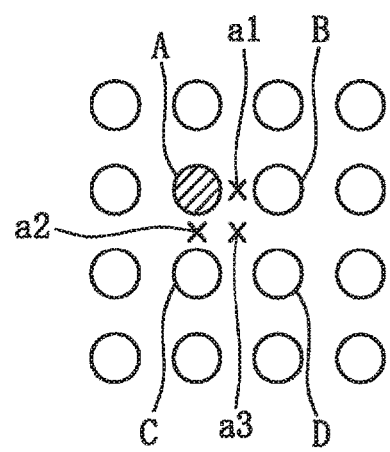
FIG. 2 is a drawing illustrating the placement relationship of a pixel included in image data, and an interpolation object position.

FIG. 1 is a block diagram illustrating a configuration of an image magnifying apparatus according to example embodiments. FIG. 2 is a drawing illustrating the placement relationship of a pixel included in image data, and an interpolation object position.

With reference to FIG. 1, a configuration of an image magnifying apparatus 1 according to example embodiments will be described. Image data, including a plurality of pixels arranged in a grid form, may be input to the image magnifying apparatus 1. The image magnifying apparatus 1 may insert an interpolation pixel between respective pixels of the input image data, and may output magnified image data.

The processor 100 included in the image magnifying apparatus 1 may include an input unit 10 receiving an input signal including image data. The image data may be input in a format such as a bitmap (BMP), a JPEG, a PNG, etc. Moreover, the processor 100 included in the image magnifying apparatus 1 may include a selection unit 11 selecting an interpolation method based on the input image data. In addition, the processor 100 included in the image magnifying apparatus 1 may include a first interpolation unit 12 generating an interpolation pixel using a first interpolation method, and a second interpolation unit 13 generating an interpolation pixel using a second interpolation method, with respect to a pixel of the image data. The first interpolation method may be or include an interpolation method emphasizing a high-band/high frequency component of an image, while the second interpolation method may be an interpolation method not emphasizing a high-band/high frequency component of an image. The processor 100 included in the image magnifying apparatus 1 may include an output unit 14, which may output a pixel, generated by an interpolation method selected by the selection unit 13, as an interpolation pixel. The image magnifying apparatus 1 may insert an interpolation pixel to some or all pixels included in the image data, and may generate magnified image data. With reference to FIG. 2, a placement relationship of an interpolation pixel will be described. In an example, input image data may be magnified twice in a lateral direction, and twice in a longitudinal direction.

An interpolation pixel with respect to a pixel A may be generated in an interpolation object position a1 between a pixel A and a pixel B, and in an interpolation object position a2 between the pixel A and a pixel C. Moreover, the interpolation pixel with respect to pixel A may be generated in an interpolation object position a3 between the pixel A and a pixel D. The interpolation object position a1 may be adjacent to the pixel A and the pixel B, arranged horizontally in a lateral direction. The interpolation object position a2 may be adjacent to the pixel A and the pixel C, arranged vertically in a longitudinal direction. The interpolation object position a3 may be adjacent to pixels around the interpolation object position a3, such as the pixel A, the pixel B, the pixel C, and the pixel D, in a diagonal direction.

The first interpolation method may be an interpolation method emphasizing a high-band/high frequency of an image as described previously. In the interpolation method, a change in a waveform/frequency in the image data is emphasized, thereby adding overshoot or undershoot. Thus, an image becomes sharpened, and a bokeh/blur phenomenon, which may occur during magnification, may be reduced. Meanwhile, a first interpolation method may cause ringing in an edge portion of an image. Thus, the first interpolation method is suitable for a natural image. In detail, a bicubic method and/or a Lanczos method may be used. However, the first interpolation method is not limited thereto, and may be or include other interpolation methods.

The second interpolation method may be an interpolation method that does not emphasize a high-band/high frequency of an image as described previously. In the interpolation method described above, an effect of reducing a bokeh/blur phenomenon in a natural image may not be obtained. On the other hand, the second interpolation method may not cause ringing in a sharpened edge portion, and may thus be suitable for a graphic image. The second interpolation method may be or include a nearest-neighbor method. However, the second interpolation method is not limited thereto, and may be or include other interpolation methods. Thus, according to inventive concepts, by using both interpolation methods as appropriate, an improved image magnification can be achieved.

Figure 3:
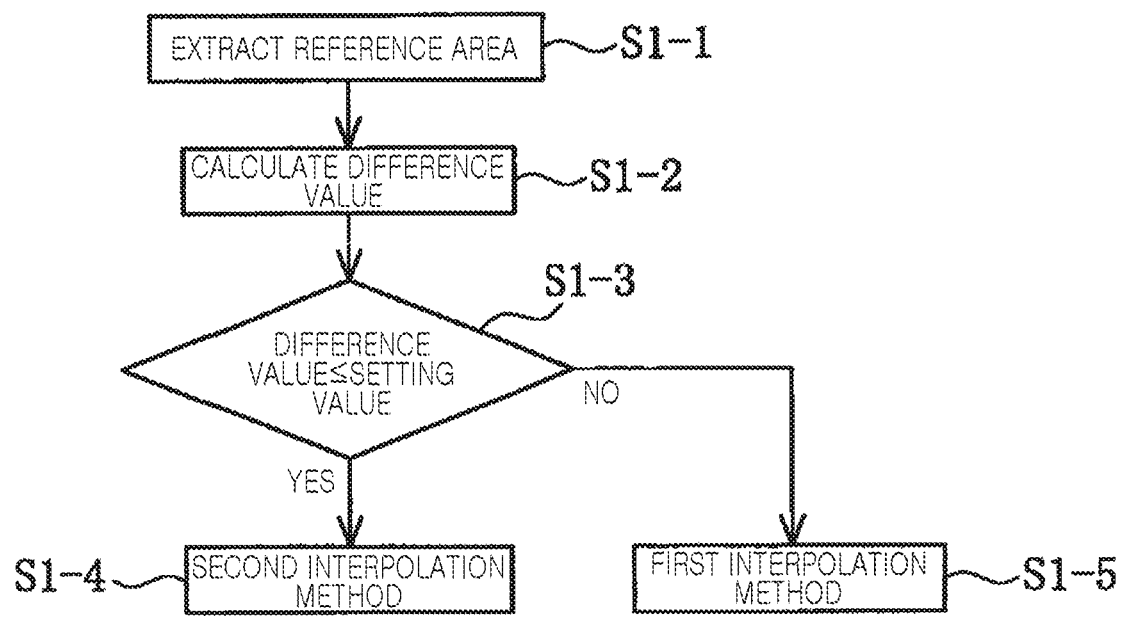
FIG. 3 is a flow chart provided to illustrate a method for selecting an interpolation method.

FIG. 3 is a flow chart provided to illustrate a method for selecting an interpolation method. FIGS. 4A to 4D are drawings illustrating a range of a reference area in a case in which an interpolation object position is adjacent to a pixel in a lateral direction, and FIGS. 5A to 5D are drawings illustrating a range of a reference area in a case in which an interpolation object position is adjacent to a pixel in a longitudinal direction. Meanwhile, FIGS. 6A to 6H are drawings illustrating a range of a reference area in a case in which an interpolation object position is adjacent to a pixel in a diagonal direction.

Referring to FIG. 3, selection of an interpolation method according to an example will be described. The selection unit 13 may extract a reference area from a periphery of an interpolation object position, as shown in step S1-1. The reference area will be described with reference to FIGS. 4A to 6H.

Figure 4A:
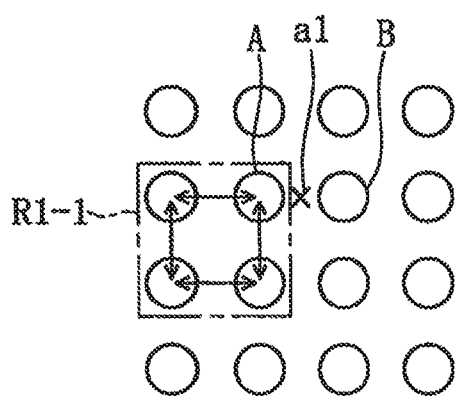
FIGS. 4A to 4D are drawings illustrating a range of a reference area in a case in which an interpolation object position is adjacent to a pixel in a lateral direction.
Figure 4B:
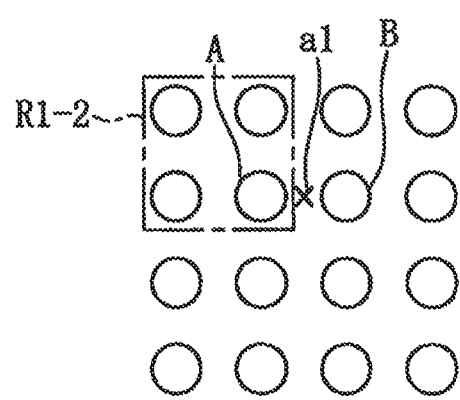
Figure 4C:
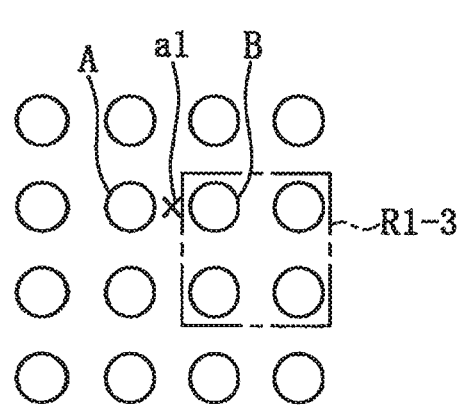
Figure 4D:
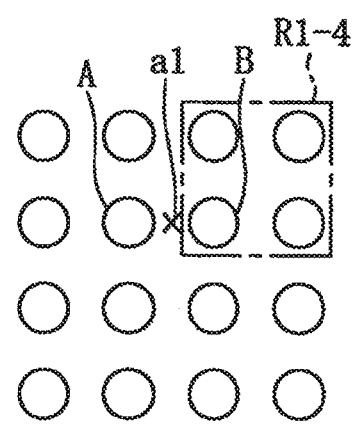

When an interpolation pixel with respect to an interpolation object position a1 is generated, a reference area may be or include four areas illustrated in FIGS. 4A to 4D. A reference area R1-1 of FIG. 4A is an area including a left pixel A with respect to the interpolation object position a1, and a lower pixel with respect to the pixel A, and may be an area having two horizontal pixels and two vertical pixels, that is, four pixels in total. A reference area R1-2 of FIG. 4B is an area in which the reference area R1-1 is shifted upwardly by a single pixel. A reference area R1-3 of FIG. 4C is an area including a right pixel B with respect to the interpolation object position a1, and a lower pixel with respect to the pixel B, and may be an area having two horizontal pixels and two vertical pixels, that is, four pixels in total. A reference area R1-4 of FIG. 4D is an area in which the reference area R1-3 is shifted upwardly by a single pixel.

Figure 5A:
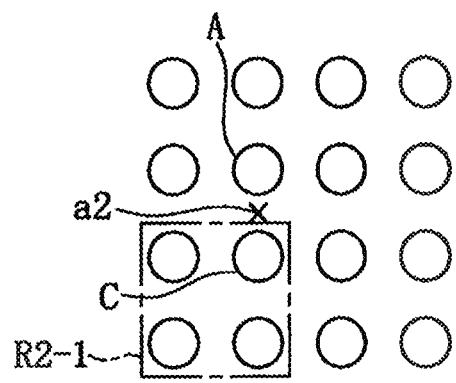
FIGS. 5A to 5D are drawings illustrating a range of a reference area in a case in which an interpolation object position is adjacent to a pixel in a longitudinal direction.
Figure 5B:
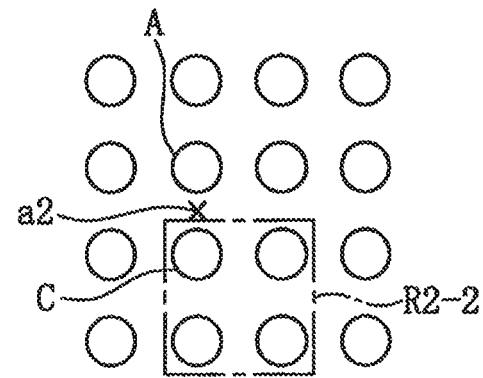
Figure 5C:
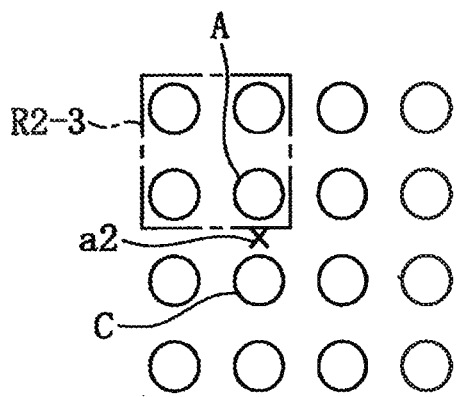
Figure 5D:
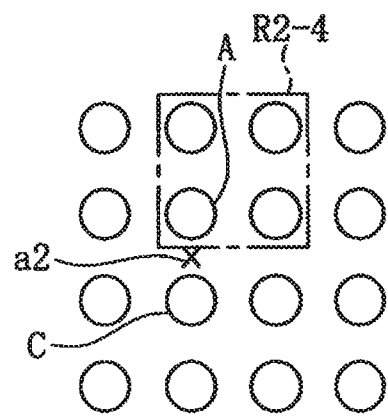

When an interpolation pixel with respect to an interpolation object position a2 is generated, a reference area may be four areas illustrated in FIGS. 5A to 5D. A reference area R2-1 of FIG. 5A is an area including a lower pixel C with respect to the interpolation object position a2, and a left pixel with respect to the pixel C, and may be an area having two horizontal pixels and two vertical pixels, that is, four pixels in total. A reference area R2-2 of FIG. 5B is an area in which the reference area R2-1 is shifted rightward by a single pixel. A reference area R2-3 of FIG. 5C is an area including an upper pixel A with respect to the interpolation object position a2, and a left pixel with respect to the pixel A, and may be an area having two horizontal pixels and two vertical pixels, that is, four pixels in total. A reference area R2-4 of FIG. 5D is an area in which the reference area R2-3 is shifted rightward by a single pixel.

Figure 6A:
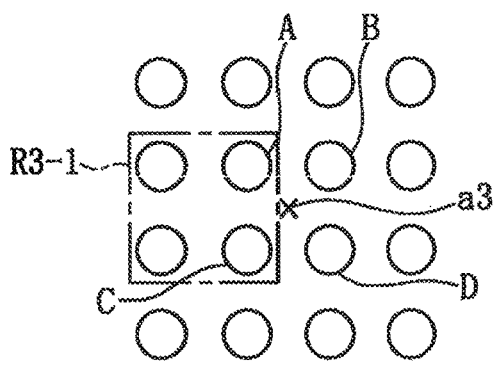
FIGS. 6A to 6H are drawings illustrating a range of a reference area in a case in which an interpolation object position is adjacent to a pixel in a diagonal direction.
Figure 6B:
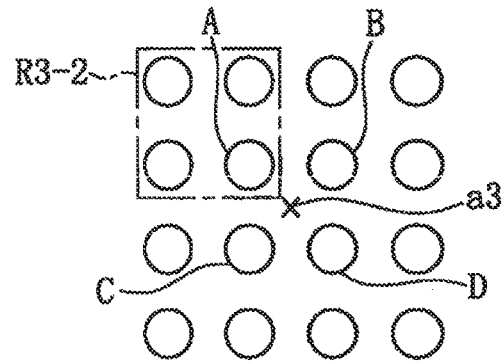
Figure 6C:
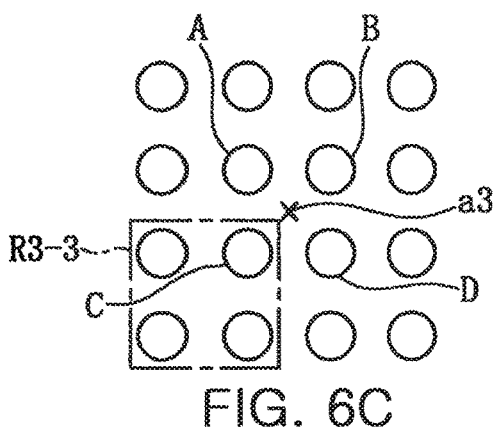
Figure 6D:
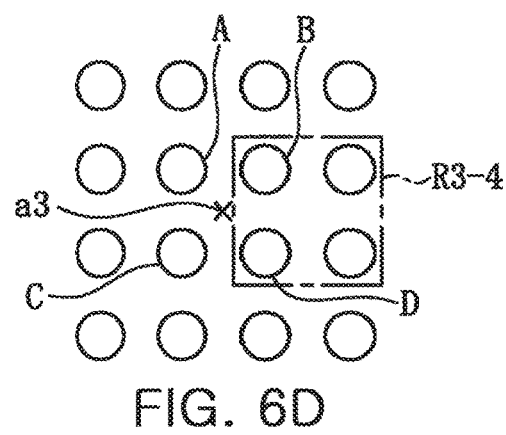
Figure 6E:
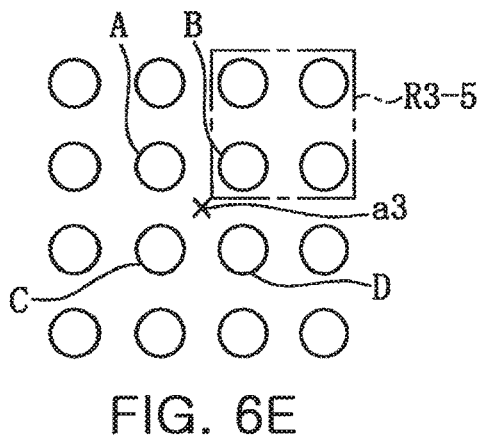
Figure 6F:
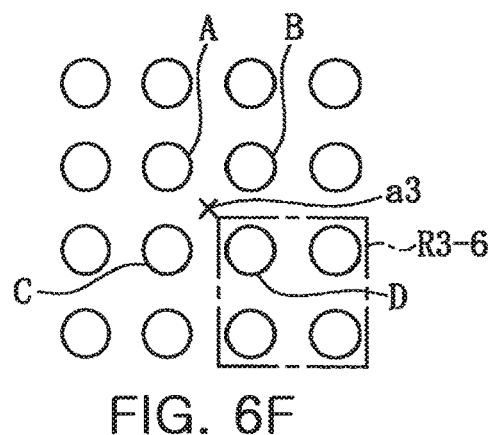
Figure 6G:
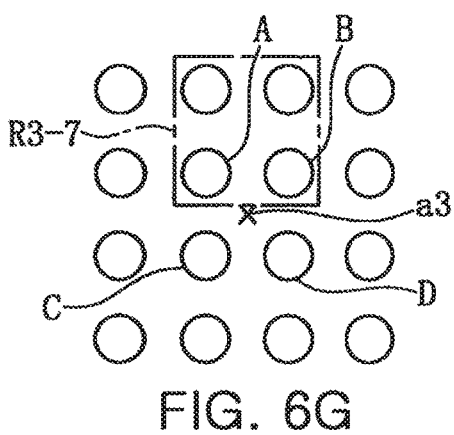
Figure 6H:
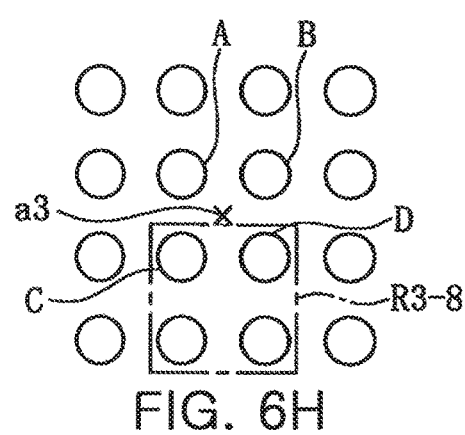

When an interpolation pixel with respect to an interpolation object position a3 is generated, a reference area may include eight areas illustrated in FIGS. 6A to 6H. A reference area R3-1 of FIG. 6A is an area including an upper left pixel A and a lower left pixel C with respect to the interpolation object position a3, and may be an area having two horizontal pixels and two vertical pixels, that is, four pixels in total. A reference area R3-2 of FIG. 6B is an area in which the reference area R3-1 is shifted upwardly by a single pixel. A reference area R3-3 of FIG. 6C is an area in which the reference area R3-1 is shifted downwardly by a single pixel. A reference area R3-4 of FIG. 6D is an area including an upper right pixel B and a lower right pixel D with respect to the interpolation object position a3, and may be an area having two horizontal pixels and two vertical pixels, that is, four pixels in total. A reference area R3-5 of FIG. 6E is an area in which the reference area R3-4 is shifted upwardly by a single pixel. A reference area R3-6 of FIG. 6F is an area in which the reference area R3-4 is shifted downwardly by a single pixel. A reference area R3-7 of FIG. 6G is an area including the upper left pixel A and the upper right pixel B with respect to the interpolation object position a3, and may be an area having two horizontal pixels and two vertical pixels, that is, four pixels in total. A reference area R3-8 of FIG. 6H is an area including the lower left pixel C and the lower right pixel D with respect to the interpolation object position a3, and may be an area having two horizontal pixels and two vertical pixels, that is, four pixels in total.

When the reference area is extracted, the selection unit 13 may calculate a difference value between adjacent pixels of each reference area (S1-2), e.g. a difference value of at least one of color or magnitude. As illustrated in FIG. 4A, in each reference area, four pairs of pixels, adjacent in a lateral direction or a longitudinal direction, may be provided. An absolute difference value with respect to each of the four pairs of pixels is calculated.

Then, with respect to each value calculated in S1-2, all values may be determined to be less than or equal to a constant setting value (S1-3). When all absolute difference values are less than or equal to a setting value, a pixel configuring the reference area may be determined to be substantially similar, and thus corresponds to a flat area, e.g. an area with low frequency. Thus, the flat area is estimated as an area of a graphic image. When at least one of the absolute difference values is greater than a setting value, the reference area may be determined to be an area which is not flat, e.g. an area with high frequency. Thus, the area which is not flat is estimated as an area of a natural image.

Determination in S1-3 may be performed by only detecting pixels with a small difference, among four pixel values included in the reference area. Thus, inventive concepts are not limited to the method described above, and other methods may be used, for example, a method in which the sum of absolute difference values, calculated from the four pairs of pixels, is less than or equal to a constant setting value, and/or the like.

The selection unit 13 of S1-3 may determine whether all absolute difference values are less than or equal to a setting value, with respect to all reference areas extracted in S1-1. As a result, when one reference area is determined as being a flat area, the selection unit 13 may select a second interpolation method (S1-4). When all reference areas are determined as being an area which is not flat, the selection unit 13 may select a first interpolation method (S1-5).

As described above, in example embodiments by determination of whether a reference area adjacent to an interpolation object position is a flat area, an interpolation method may be selected. Thus, a first interpolation method suitable for a high-band/high frequency interpolation may be applied to an area of a natural image, while a second interpolation method not suitable for a high-band/high frequency may be applied to an area of a graphic image. According to selection of the interpolation method described above, a bokeh/blur phenomenon which may occur during magnification in an area of a natural image may be reduced, while an edge portion may be simultaneously prevented, or reduced in likelihood, from being unnatural in an area of a graphic image.

Figure 7:
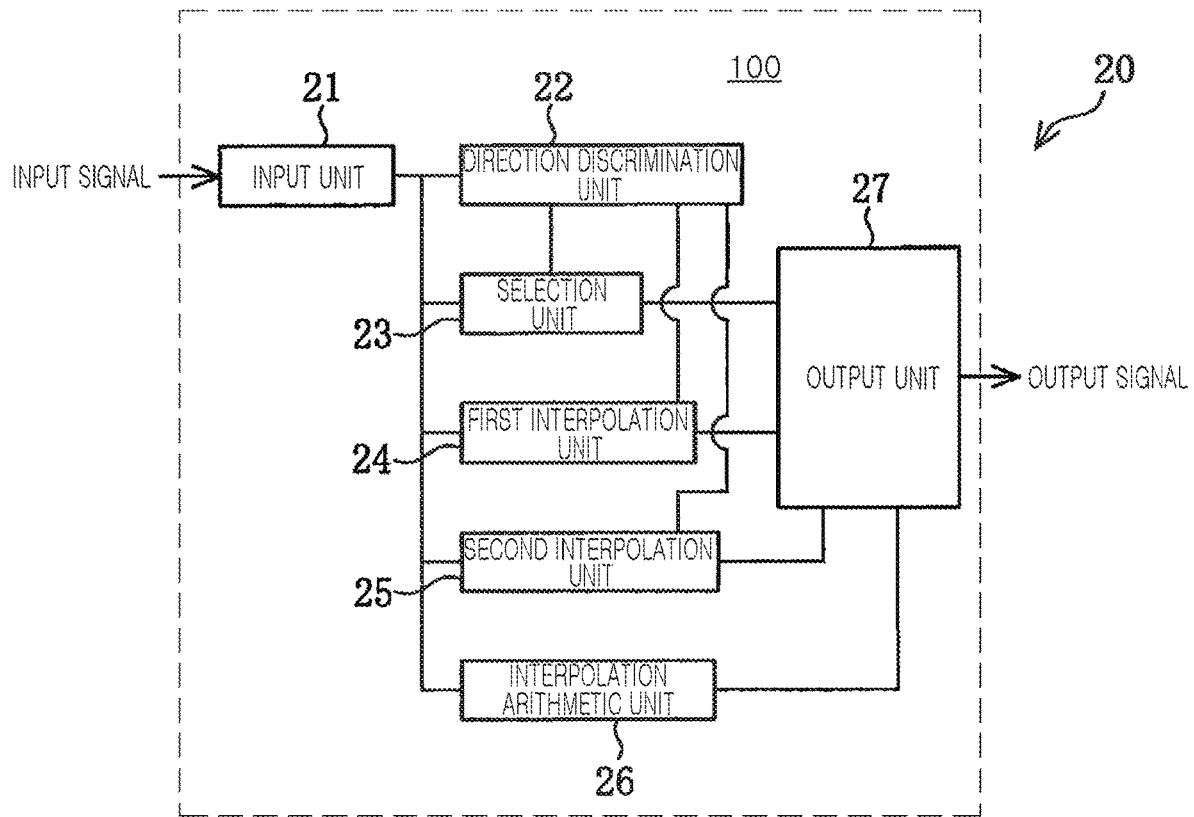
FIG. 7 is a block diagram illustrating a configuration of an image magnifying apparatus according to some example embodiments.
Figure 8:
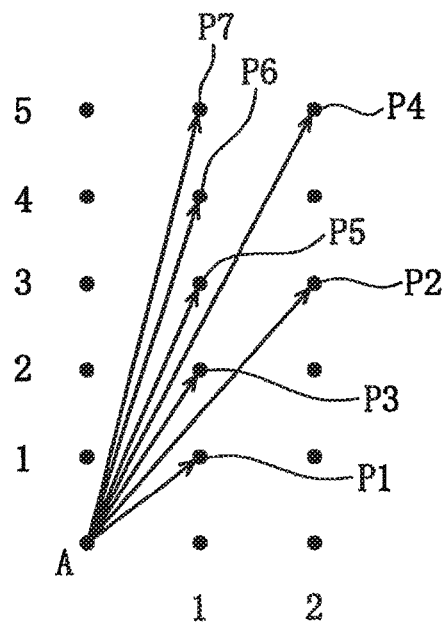
FIG. 8 is a drawing illustrating a standardized direction, in a direction based on a specific pixel.

FIG. 7 is a block diagram illustrating a configuration of an image magnifying apparatus according to example embodiments. FIG. 8 is a drawing illustrating a standardized direction, in a direction based on a specific pixel.

With reference to FIGS. 7 and 8, example embodiments will be described. As illustrated in FIG. 7, an image magnifying apparatus 20 according to example embodiments may have an input unit 21 receiving an input signal. The image data including the input signal received by the input unit 21 may be transmitted to a direction discrimination unit 22. In the direction discrimination unit 22, presence or absence of a direction of an interpolation object position may be determined. Moreover, the image magnifying apparatus 20 may include a first interpolation unit 24 and a second interpolation unit 25, as well as a selection unit 23 selecting one of the first interpolation unit and the second interpolation unit. Furthermore, the image magnifying apparatus 20 may include an interpolation arithmetic unit 26 applied when directional interpolation is not performed.

The directional interpolation may be a method of detecting a correlation direction, e.g. a shift, from image data, and selecting a pixel for interpolation from a direction parallel to the correlation direction. Thus, unsharpening/bluring of an edge, caused by magnification of an image, may be prevented or reduced in likelihood of occurrence. For a method of detecting direction in an interpolation object position, a Sobel filter may be used. However, the method of detecting direction is not limited thereto, and may be or include other methods, for example, a Prewitt filter, and/or the like.

The first interpolation method applied to the first interpolation unit 24, and the second interpolation method applied to the second interpolation unit 25 may be or include a method of directional interpolation. When the directional interpolation is performed, information on a correlation direction may be required or used for selecting a pixel used for interpolation. Pixels of image data are arranged at regular intervals in longitudinal and lateral directions, so information on an angle required or desired for selecting a pixel may be standardized based on placement of the pixels. As illustrated in FIG. 8, based on a pixel A, a direction toward a pixel P1, separated by a single pixel in a lateral direction and by two pixels in a longitudinal direction may be defined as ⌈1⌉. Based on the pixel A, a direction toward a pixel P2, separated by two pixels in a lateral direction and by three pixels in a longitudinal direction may be defined as ⌈2/3⌉. In a similar manner, a direction from the pixel A toward a pixel P3 may be defined as ⌈2⌉, and a direction from the pixel A toward a pixel P4 may be defined as ⌈5/2⌉. Moreover, a direction from the pixel A toward a pixel P5 may be defined as ⌈3⌉, a direction from the pixel A toward a pixel P6 may be defined as ⌈4⌉, and a direction from the pixel A toward a pixel P7 may be defined as ⌈5⌉. An angular range to a direction ⌈1⌉ from a horizontal direction based on the pixel A may be represented as an inverse number thereof. In addition, the direction described above is a direction toward a first upper limit and a third upper limit. Alternatively a direction toward a second upper limit and a fourth upper limit may be represented as a negative direction.

Figure 9:
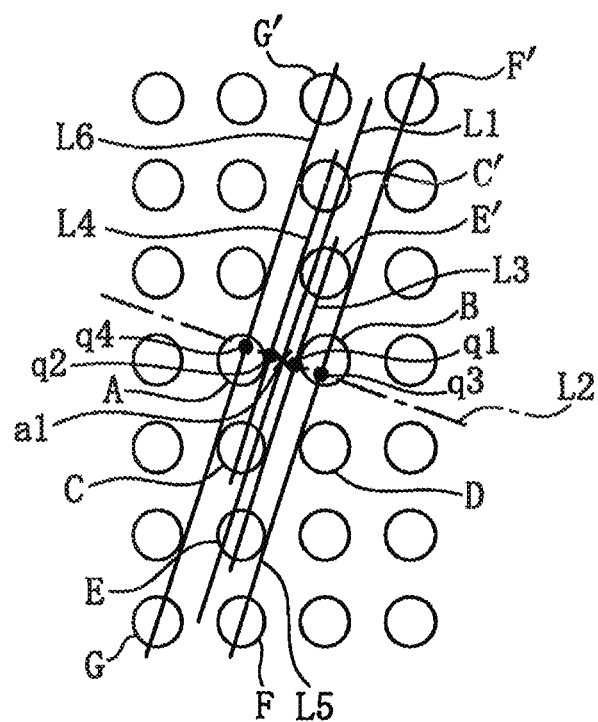
FIG. 9 is a schematic drawing illustrating a first interpolation method according to some example embodiments.
Figure 10:
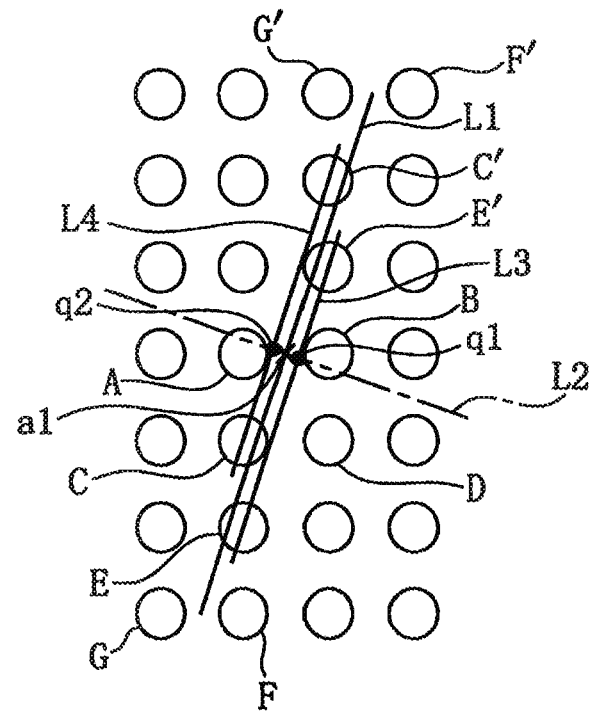
FIG. 10 is a schematic drawing illustrating a second interpolation method according to some example embodiments.

FIG. 9 is a schematic drawing illustrating a first interpolation method according to example embodiments, and FIG. 10 is a schematic drawing illustrating a second interpolation method according to example embodiments.

First, a first interpolation method will be described with reference to FIG. 9. A first interpolation method may be or include an interpolation method emphasizing, e.g. suitable for, a high-band/high frequency, in a manner similar to the first example. In an example, it is assumed that a correlation direction of an interpolation object position a1 is a direction ⌈3⌉. To generate an interpolation pixel in an interpolation object position a1 using the first interpolation method, four pixels may be required or used.

First, a line L1 in a direction ⌈3⌉, passing through an interpolation object position a1, and a line L2, a normal of the line L1, may be generated. Then, as a line parallel to the line L1, a line passing through a center position of another pixel may be generated, and a plurality of the lines described above may be provided. As a line closest to the line L1, among the lines described above, a line L3 passing through the center of a pixel E and the center of a pixel E', and a line L4 passing through the center of a pixel C and the center of a pixel C' may be generated. A point of intersection of the line L3 and the line L2 may be defined as a point for interpolation q1. A pixel value of the point for interpolation q1 may be calculated from pixel values of the pixel E and the pixel E'. Moreover, a point of intersection of the line L4 and the line L2 may be defined as a point for interpolation q2, and a pixel value of the point for interpolation q2 may be calculated from pixel values of the pixel C and the pixel C'. As a line closest to the line L1, other than the line L3 and the line L4, a line L5 passing through the center of a pixel F and the center of a pixel F', and a line L6 passing through the center of a pixel G and the center of a pixel G' may be generated. A point of intersection of the line L5 and the line L2 may be defined as a point for interpolation q3, and a pixel value of the point for interpolation q3 may be calculated from pixel values of the pixel F and the pixel F'. Moreover, a point of intersection of the line L6 and the line L2 may be defined as a point for interpolation q4. A pixel value of the point for interpolation q4 may be calculated from pixel values of the pixel G and the pixel G'. Each point for interpolation is calculated using a bilinear method.

Then, from four points, points for interpolation q1, q2, q3, and q4, using the bicubic method, a pixel of the interpolation object position a1 may be generated. As described above, in a correlation direction detected in an interpolation object position, a pixel value of four points for interpolation may be calculated using a pixel, which is actually present. Thus, the generation of an interpolation pixel using a bicubic method may be performed. The bicubic method is used for generation of an interpolation pixel, thereby generating a diagonal line with high sharpness. Meanwhile, in the case of other correlation directions and interpolation object positions, in a similar manner, four points for interpolation may be calculated, and an interpolation pixel may be generated using a bicubic method.

Then, a second interpolation method will be described with reference to FIG. 10. The second interpolation method may be or include an interpolation method not emphasizing/suitable for a high-band/high frequency of an image, in a manner similar to the first example. In an example, it is assumed that a correlation direction of an interpolation object position a1 is a direction ⌈3⌉. To generate an interpolation pixel in an interpolation object position a1 using the second interpolation method, two pixels may be required or used.

First, a line L1 in a direction ⌈3⌉, passing through an interpolation object position a1, and a line L2, a normal (perpendicular) of the line L1, may be generated. Then, as a line parallel to the line L1, a line closest to the line La, among lines passing through center positions of other pixels, may be generated. Here, in a manner similar to the case of FIG. 8, the line described above may be a line L3 passing through the center of a pixel E and the center of a pixel E', and a line L4 passing through the center of a pixel C and the center of a pixel C'. A point of intersection of the line L3 and the line L2 may be defined as a point for interpolation q1, and a pixel value of the point for interpolation q1 may be calculated from pixel values of the pixel E and the pixel E'. Moreover, when a point of intersection of the line L4 and the line L2 may be defined as a point for interpolation q2, a pixel value of the point for interpolation q2 may be calculated from pixel values of the pixel C and the pixel C'. Each point for interpolation may be calculated using a bilinear method.

Then, from two points, points for interpolation q1 and q2, using the bilinear method, a pixel of the interpolation object position a1 may be generated. As described above, in a correlation direction detected in an interpolation object position, a pixel value of two points for interpolation may be calculated using a pixel, which is actually present. Thus, generation of an interpolation pixel using a bilinear method may be performed. The bilinear method is used for generation of an interpolation pixel, thereby generating a smooth diagonal line.

An interpolation method used for the interpolation arithmetic unit 26 may be an interpolation method according to the related art, other than directional interpolation. The interpolation arithmetic unit 26 may be an arbitrary interpolation method such as a bilinear method, a bicubic method, or the like. Moreover, two interpolation units and a selection unit are provided in the interpolation arithmetic unit 26, and an interpolation method may be selected according to whether a reference area is flat area in a manner similar to the first example.

Figure 11:
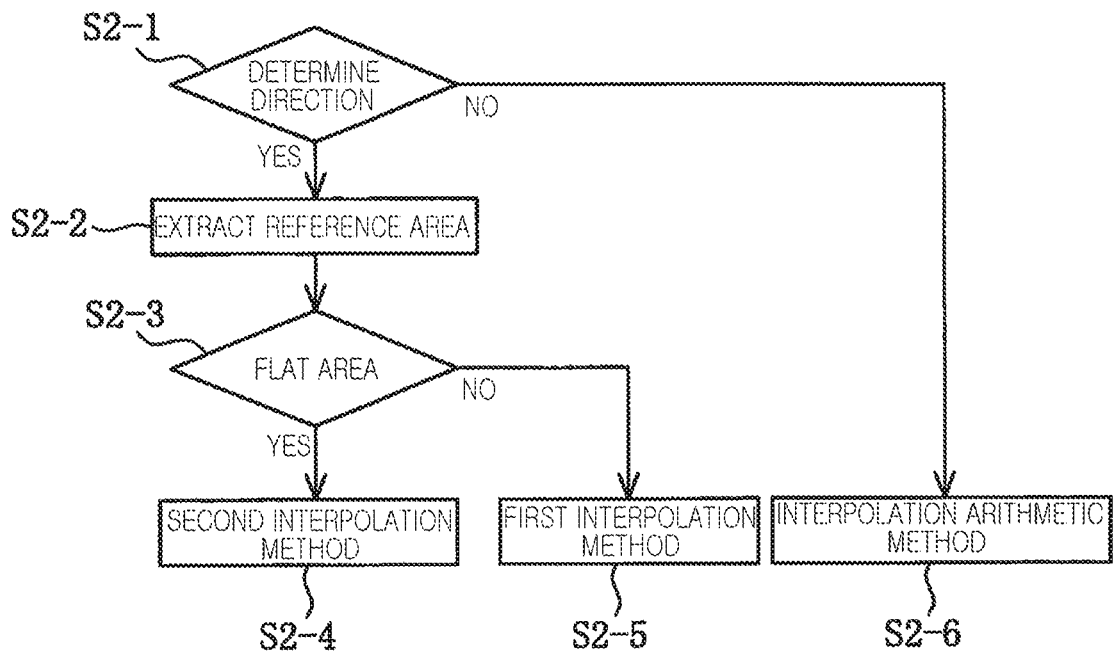
FIG. 11 is a flow chart provided to illustrate selection of an interpolation method according to some example embodiments.

FIG. 11 is a flow chart provided to illustrate selection of an interpolation method according to example embodiments.

Referring to FIG. 11, selection of an interpolation method according to an example will be described. First, the direction discrimination unit 22 may detect presence or absence of direction of an interpolation object position and a direction (S2-1). When the direction is detected in S2-1, the selection unit 23 may extract a reference area from a periphery of an interpolation object position (S2-2). The reference area extracted in S2-2 may be similar to that in the case of the first example.

When the selection unit 23 extracts the reference area, a difference value between adjacent pixels of each reference area may be calculated, and it may be determined whether the reference area is a flat area (e.g. low frequency area) or not (S2-3). Determination of whether the reference area is a flat area may be similar to that in the case of the first example. Moreover, determination of S2-3 may be performed with respect to all reference areas, which are extracted.

In S2-3, when one reference area is determined as being a flat area (e.g. low frequency area), the selection unit 23 may select a second interpolation method (S2-4). When all reference areas are determined as being an area which is not flat, the selection unit 23 may select a first interpolation method (S2-5).

Moreover, when direction is not detected in S2-1, an interpolation arithmetic method may be selected (S2-6).

As described above, in an example, by determination of whether a reference area adjacent to an interpolation object position is a flat area, a directional interpolation method may be selected. Thus, a diagonal line with sharpness is generated in an area of a natural image, while a diagonal line in which ringing is suppressed may be generated in an area of a graphic image.

Figure 12:
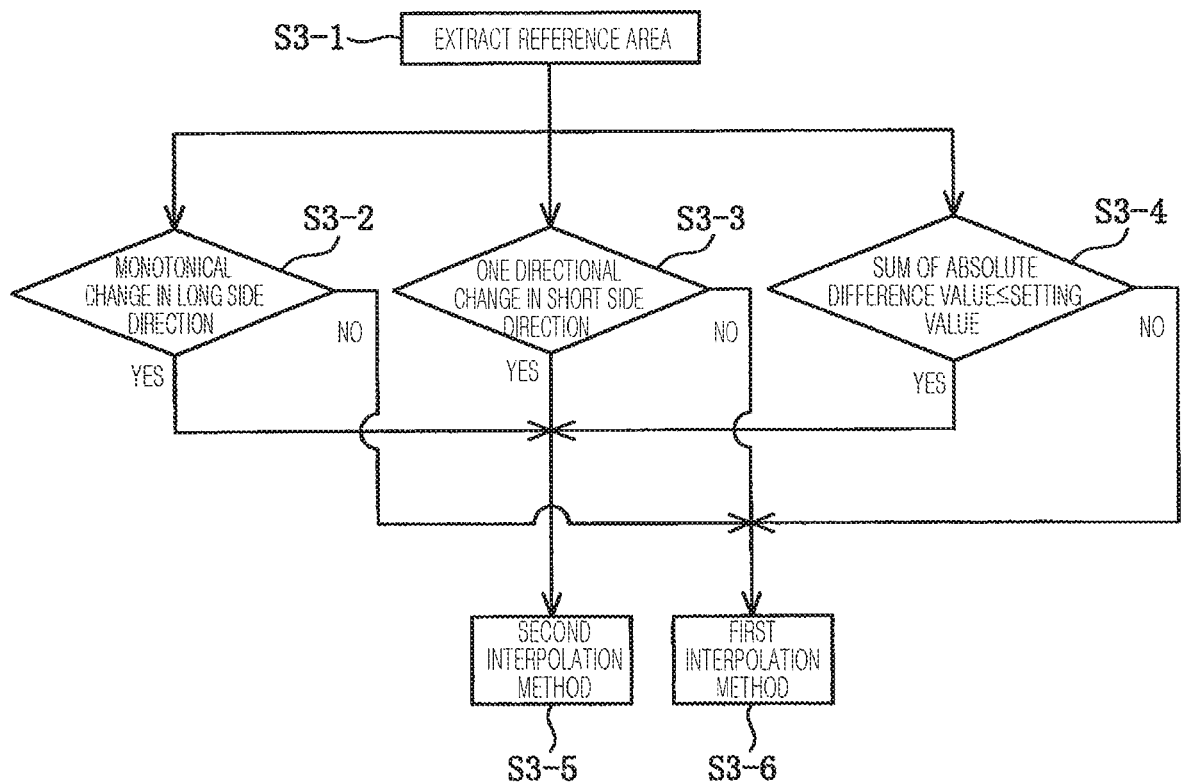
FIG. 12 is a flow chart provided to illustrate selection of an interpolation method according to some example embodiments.
Figure 13A:
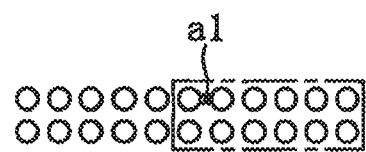
FIGS. 13A to 13F are drawings illustrating a range of a reference area in a case in which an interpolation object position is adjacent to a pixel in a lateral direction, according to some example embodiments.
Figure 13B:
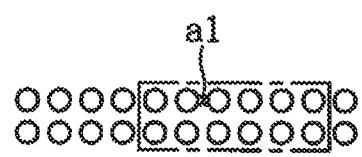
Figure 13C:
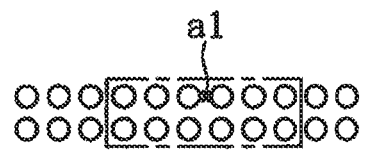
Figure 13D:
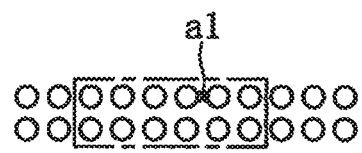
Figure 13E:
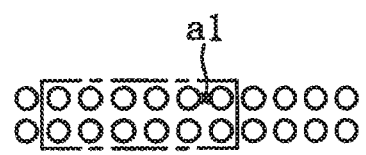
Figure 13F:
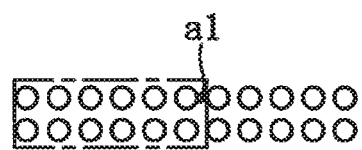
Figure 14A:
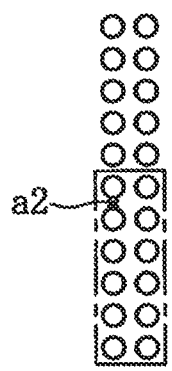
FIGS. 14A to 14F are drawings illustrating a range of a reference area in a case in which an interpolation object position is adjacent to a pixel in a lateral direction, according to some example embodiments.
Figure 14B:
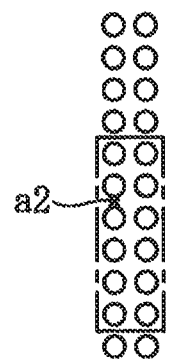
Figure 14C:
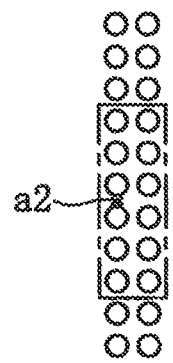
Figure 14D:
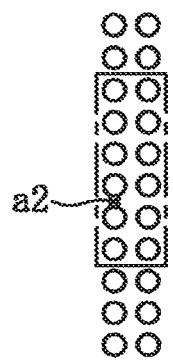
Figure 14E:
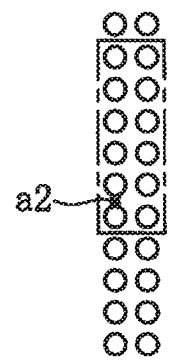
Figure 14F:
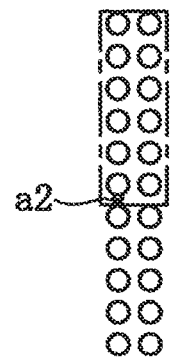
Figure 15A:
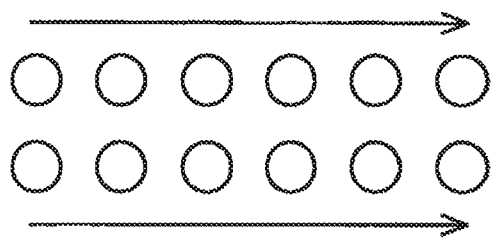
FIGS. 15A to 15C are schematic drawings illustrating contents of an operation performed on a reference area, according to some example embodiments.
Figure 15B:
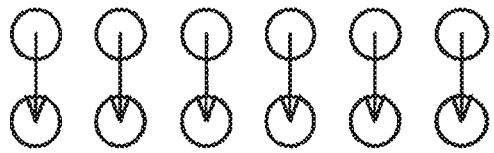
Figure 15C:
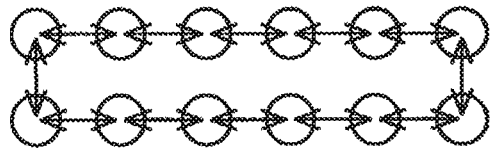

FIG. 12 is a flow chart provided to illustrate selection of an interpolation method according to example embodiments. FIGS. 13A to 13F are drawings illustrating a range of a reference area in a case in which an interpolation object position is adjacent to a pixel in a lateral direction, according to example embodiments, and FIGS. 14A to 14F are drawings illustrating a range of a reference area in a case in which an interpolation object position is adjacent to a pixel in a longitudinal direction, according to example embodiments. FIGS. 15A to 15C are schematic drawings illustrating contents of an operation performed on a reference area, according to example embodiments.

With reference to FIGS. 12 to 15C, example embodiments will be described. A configuration of an image magnifying apparatus 1 according to the example may be similar to that according to the first example. In an example, the selection unit 13 may determine whether a pattern of gradation is present around an interpolation object position.

In the example, the first interpolation method may be or include a bicubic method, or a Lanczos method. However, the first interpolation method is not limited thereto, and may be other interpolation methods emphasizing a high-band.

In the example, the second interpolation method may be or include a nearest-neighbor method or a bilinear method. However, the second interpolation method is not limited thereto, and may be other interpolation methods not emphasizing a high-band.

First, referring to FIG. 12, selection of an interpolation method according to an example will be described. The selection unit 13 may extract a reference area from a periphery of an interpolation object position, first (S3-1). The reference area will be described with reference to FIGS. 13 and 14.

First, an interpolation object position a1 adjacent to both pixels in a lateral direction will be described. When an interpolation pixel is generated in an interpolation object position a1, as illustrated in FIGS. 13A to 13F, a widthwise reference area including six pixels in a lateral direction and two pixels in a longitudinal direction may be extracted. In the reference area of FIG. 13A, a left pixel with respect to an interpolation object position a1 may be defined as a position of an upper left end of the reference area. As illustrated in FIGS. 13B to 13F, a reference area in which the reference area of FIG. 13A is shifted by a single pixel in a left direction may be also extracted. Moreover, a reference area in which each of six reference areas illustrated in FIGS. 13A to 13F is shifted upwardly by a single pixel may be also extracted.

Then, an interpolation object position a2 adjacent to both pixels in a longitudinal direction will be described. When an interpolation pixel is generated in an interpolation object position a2, as illustrated in FIGS. 14A to 14F, a lengthwise reference area including two pixels in a lateral direction and six pixels in a longitudinal direction may be extracted. In the reference area of FIG. 14A, an upper pixel of the interpolation object position a2 may be located in an upper left end of the reference area. Meanwhile, as illustrated in FIGS. 14B to 14F, a reference area in which the reference area of FIG. 14A is shifted by a single pixel upwardly may be also extracted. Moreover, a reference area in which each of six reference areas illustrated in FIGS. 14A to 14F is shifted leftward by a single pixel is also extracted.

Then, an interpolation object position a3 adjacent to four adjacent pixels in a diagonal direction will be described. When an interpolation pixel is generated in an interpolation object position a3, the widthwise reference area of FIGS. 13A to 13F and the lengthwise reference area of FIGS. 14A to 14F may be extracted in both directions. Twelve widthwise reference areas may be extracted, in a manner similar to the interpolation object position a1. Moreover, twelve lengthwise reference areas may be extracted, in a manner similar to the interpolation object position a2.

Then, whether the extracted reference area is satisfied with three conditions may be determined. As illustrated in FIG. 15A, a first condition is whether pixel values in two rows in a long side direction of a reference area are monotonically increased or monotonically decreased in one direction. Determination of the first condition may be performed in S3-2. As illustrated in FIG. 15B, a second condition is whether six pixel values in a short side direction of the reference area is increased or decreased in one direction. Determination of the second condition may be performed in S3-3. As illustrated in FIG. 15C, a third condition is that respective difference values between adjacent pixels in the reference area are calculated, and it is determined that the sum of the difference values is less than or equal to a constant setting value. Determination of the third condition may be performed in S3-4. In S3-2, S3-3, and S3-4, it may be determined whether all extracted reference areas are satisfied with the first condition, the second condition, and the third condition, respectively.

When any one reference area is satisfied with one or more among the first to third conditions, the periphery of the interpolation object position is determined to be a pattern of gradation. In this case, the second interpolation method is selected (S3-5). On the other hand, when all reference areas are not satisfied with the first to third conditions, the periphery of the interpolation object position is determined to not be a pattern of gradation. In this case, the first interpolation method is selected (S3-6).

When the first interpolation method emphasizing a high-band is applied to a pattern of gradation, a fine luminance difference, present in the gradation, may be emphasized. Thus, stripes referred to as banding may occur. In an example, whether a pattern of gradation is present around an interpolation object position is determined. In the case of gradation, a second interpolation method not emphasizing a high-band may be selected. Thus, banding may be prevented, or reduced in likelihood, from occurring.

Moreover, a plurality of reference areas are extracted around an interpolation object position, so an end area of the gradation is also reliably determined.

Figure 16:
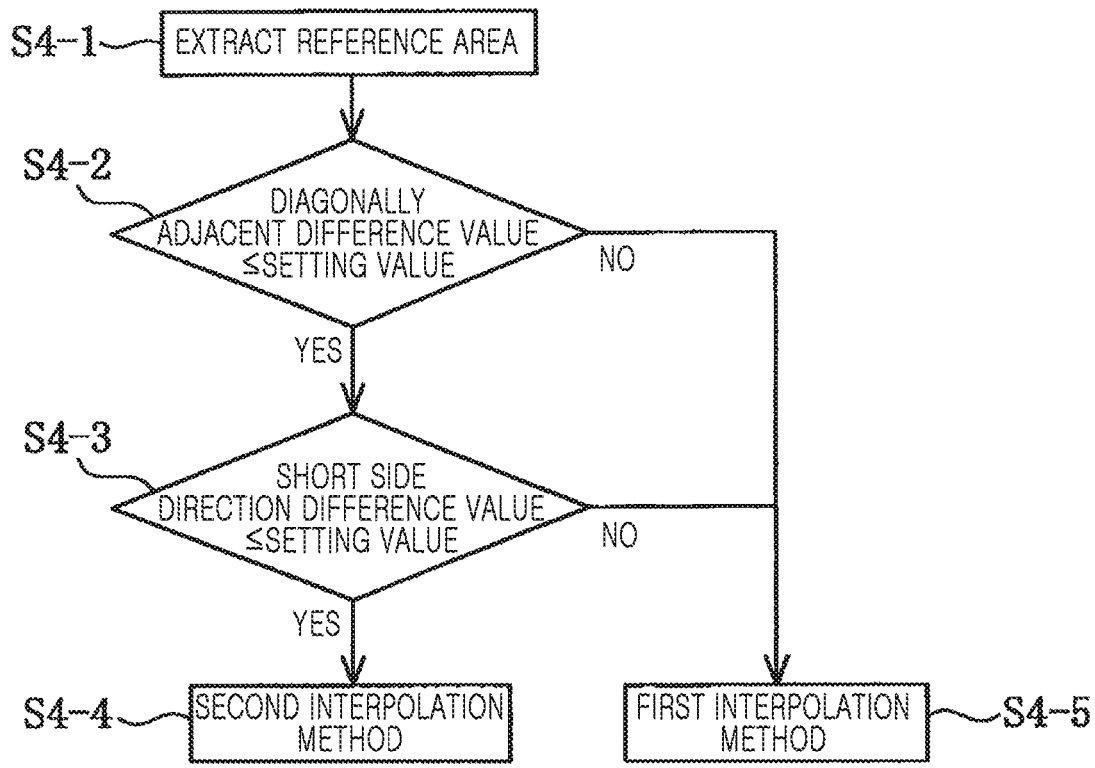
FIG. 16 is a flow chart provided to illustrate selection of an interpolation method according to some example embodiments.
Figure 17A:
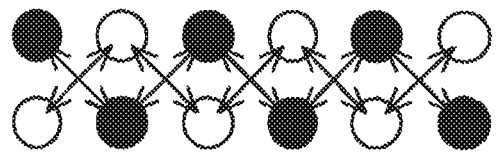
FIGS. 17A and 17B are schematic drawings illustrating contents of an operation performed on a reference area, according to some example embodiments.
Figure 17B:
Figure 18A:
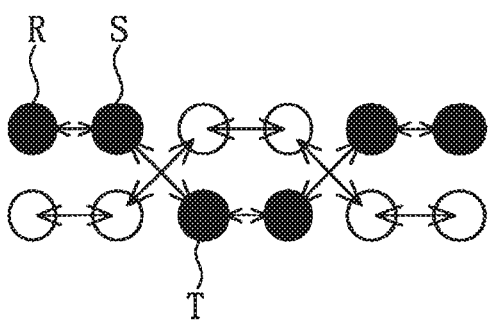
FIGS. 18A and 18B are schematic drawings illustrating contents of an operation performed on a reference area, in a case in which a single unit forming a plover pattern is two adjacent pixels.
Figure 18B:
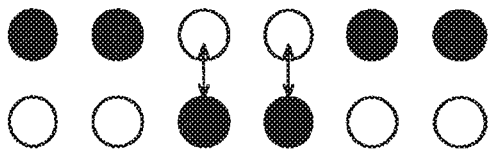

FIG. 16 is a flow chart provided to illustrate selection of an interpolation method according to example embodiments. Meanwhile, FIGS. 17A and 17B are schematic drawings illustrating contents of an operation performed on a reference area, according to example embodiments, and FIGS. 18A and 18B are schematic drawings illustrating contents of an operation performed on a reference area, in a case in which a single unit configuring a pattern is two neighboring pixels.

Example embodiments will be described. A configuration of an image magnifying apparatus 1 according to the example may be similar to that according to the first example. In an example, the selection unit 13 may determine whether a pattern in a plover shape is present around an interpolation object position. In the example, the first interpolation method may be or include a bicubic method, and/or a Lanczos method. However, the first interpolation method is not limited thereto, and may be or include other interpolation methods emphasizing a high-band. Moreover, in the example, the second interpolation method may be a nearest-neighbor method. However, the second interpolation method is not limited thereto, and may be or include another interpolation method not emphasizing a high-band.

Referring to FIG. 16, selection of an interpolation method according to an example will be described. The selection unit 13 may extract a reference area from a periphery of an interpolation object position, first (S4-1). The extracted reference area is the same as that described previously, so a description thereof will be omitted.

Then, whether the extracted reference area is satisfied with two conditions may be determined. The first condition is whether an absolute difference value between adjacent pixels in a diagonal direction in a reference area is less than or equal to a constant setting value. As illustrated in FIG. 17A, a pair of pixels adjacent to each other in a diagonal direction in a reference area is provided as ten pairs of pixels in total. When a reference area has a plover shape, a difference between pixels adjacent to each other in a diagonal direction may be small. In this regard, it may be detected using a first condition.

A second condition is whether each difference value between pixels in two groups located in the center of a reference area in a long side direction and located in a short side direction is calculated, and the difference value is greater than or equal to a constant setting value. As illustrated in FIG. 17B, when a reference area has a plover shape, a difference between pixels adjacent to each other in a short side direction may be great. In this regard, it may be detected using a second condition.

FIG. 17 illustrates a widthwise reference area, and the first condition and the second condition are similarly determined in the case of a lengthwise reference area.

As a result of determination of a first condition in S4-2, when a reference area is satisfied with the first condition, a second condition may be determined in S4-3. When the second condition is satisfied in S4-3, a second interpolation method may be selected. When a reference area is not satisfied with a first condition or a second condition in S4-2 or S4-3, a first interpolation method may be selected. A plurality of reference areas are extracted, so determination with respect to each reference area is performed. When one reference area is satisfied with a first condition and a second condition, the selection unit 13 may select a second interpolation method.

FIGS. 17A and 17B illustrate a case in which a single unit configuring a weave shape is a single pixel. Alternatively, as illustrated in FIGS. 18A and 18B, a single unit configuring a weave shape may be provided as two neighboring pixels. In an example, the case is preferable that the condition described above is additionally added. A single unit configuring a weave shape in a reference area may be two neighboring pixels in a long side direction, in a similar manner to a pixel R and a pixel S of FIG. 18A. In this case, the first condition is that an absolute difference value between pixels in a single unit is less than or equal to a setting value, and an absolute difference value between pixels in a unit, adjacent to each other in a diagonal direction, is less than or equal to a setting value. For example, in FIG. 18A, a pixel S and a pixel T are adjacent to each other in a diagonal direction. In a reference area, a unit adjacent in a diagonal direction may be provided as six pairs. In a manner similar to the case of FIGS. 17B and 18B, a second condition is whether an absolute difference value between pixels in two groups located in the center of a reference area in a long side direction and located in a short side direction is greater than or equal to a setting value. When the conditions are satisfied, it is determined that a pattern having a weave shape is present.

Meanwhile, a single unit configuring a weave shape has two or more horizontal pixels and two or more vertical pixels, it may be determined as the flat area described in the first example.

When a first interpolation method, in which adjacent pixels to an interpolation object position are mixed, is applied to a weave shape regularly arranged, a pattern having a weave shape may be collapsed. In an example, it is determined whether an interpolation object position has a shape included in a weave shape. When the interpolation object position has a weave shape, a second interpolation method in which pixels are not mixed may be selected. Thus, while a weave shape is maintained, an image may be magnified.

Moreover, as a plurality of reference areas are extracted around an interpolation object position, so an end area of the weave shape is also reliably determined.

Figure 19:
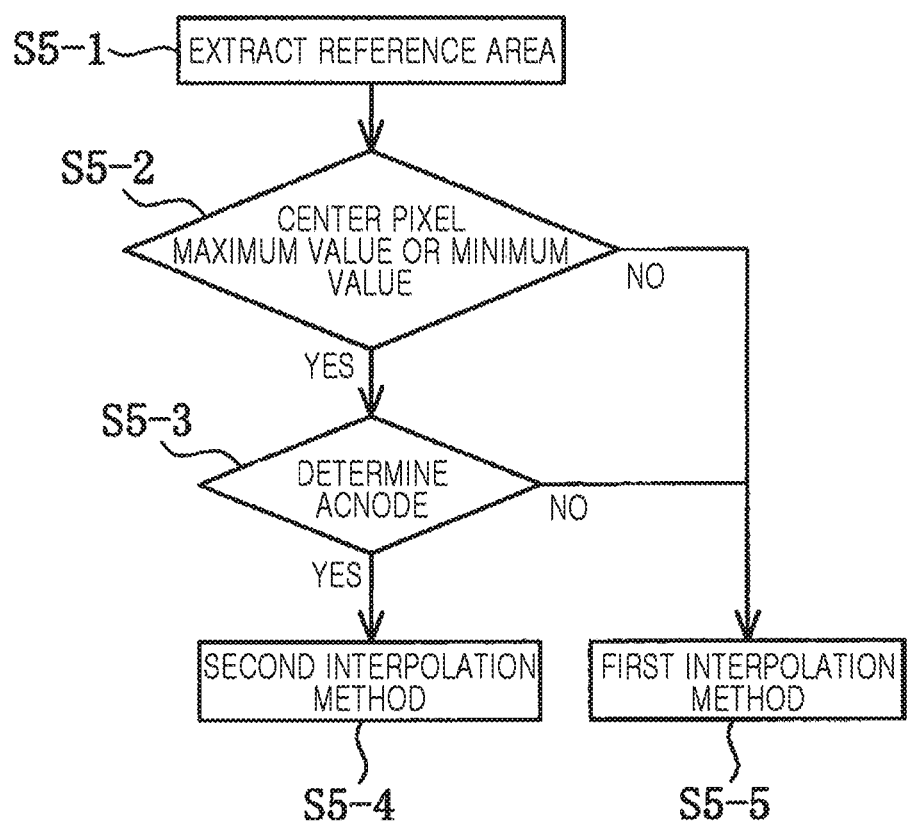
FIG. 19 is a flow chart provided to illustrate selection of an interpolation method according to some example embodiments.
Figure 20A:
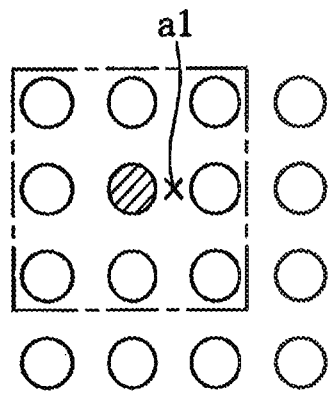
FIGS. 20A and 20B are drawings illustrating a range of a reference area in a case in which an interpolation object position is adjacent to a pixel in a lateral direction, according to some example embodiments.
Figure 20B:
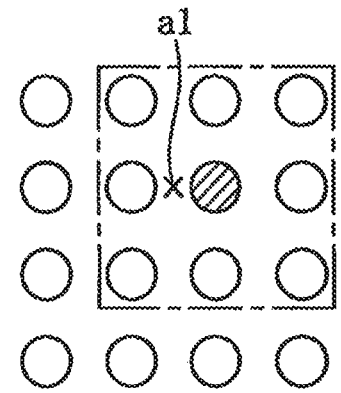
Figure 21A:
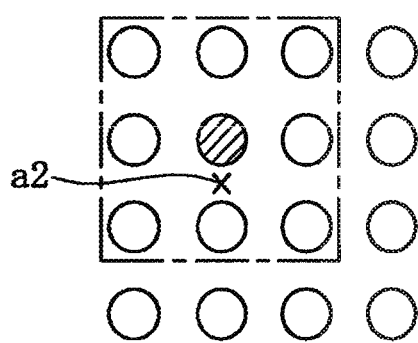
FIGS. 21A and 21B are drawings illustrating a range of a reference area in a case in which an interpolation object position is adjacent to a pixel in a longitudinal direction, according to some example embodiments.
Figure 21B:
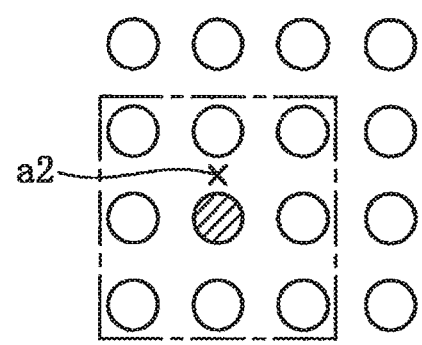
Figure 22A:
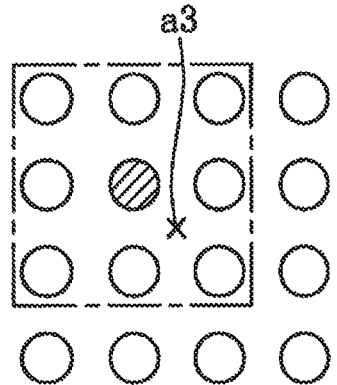
FIGS. 22A to 22D are drawings illustrating a range of a reference area in a case in which an interpolation object position is adjacent to a pixel in a diagonal direction, according to some example embodiments.
Figure 22B:
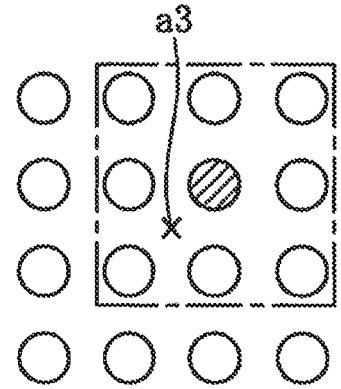
Figure 22C:
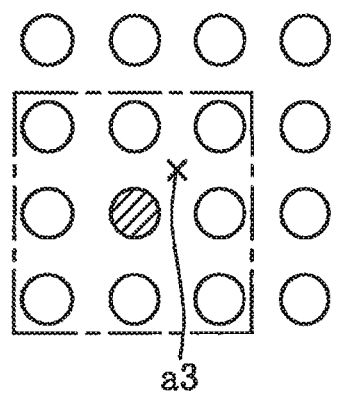
Figure 22D:
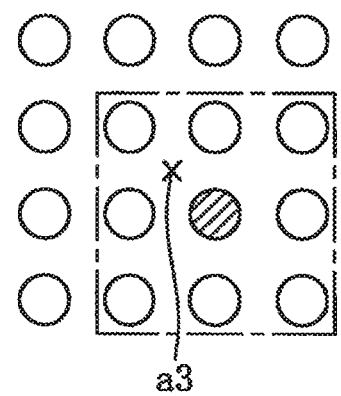

FIG. 19 is a flow chart provided to illustrate selection of an interpolation method according to example embodiments. FIGS. 20A and 20B are drawings illustrating a range of a reference area in a case in which an interpolation object position is adjacent to a pixel in a lateral direction, according to example embodiments, and FIGS. 21A and 21B are drawings illustrating a range of a reference area in a case in which an interpolation object position is adjacent to a pixel in a longitudinal direction, according to example embodiments. Meanwhile, FIGS. 22A to 22D are drawings illustrating a range of a reference area in a case in which an interpolation object position is adjacent to a pixel in a diagonal direction, according to example embodiments.

Example embodiments will be described. A configuration of an image magnifying apparatus 1 according to the example may be similar to that according to the first example. In an example, the selection unit 13 may determine whether a pixel adjacent to an interpolation object position is an anode.

In the example, the first interpolation method may be or include a bicubic method, and/or a Lanczos method. However, the first interpolation method is not limited thereto, and may be or include other interpolation methods emphasizing a high-band.

In the example, the second interpolation method may be or include a nearest-neighbor method. However, the second interpolation method is not limited thereto, and may be or include other interpolation methods emphasizing a highband.

Hereinafter, referring to FIG. 19, selection of an interpolation method according to an example will be described. The selection unit 13 may extract a reference area from a periphery of an interpolation object position, first (S5-1). The reference area will be described with reference to FIGS. 20A to 22D.

First, an interpolation object position a1 adjacent to both pixels in a lateral direction will be described. In this case, a pixel adjacent to an interpolation object position a1 in a lateral direction is provided as a center pixel, and an area including three horizontal pixels and three vertical pixels may be defined as a reference area. Two pixels adjacent to an interpolation object position a1 in a lateral direction are provided, so two reference areas are extracted, as illustrated in FIGS. 20A and 20B.

Then, an interpolation object position a2 adjacent to both pixels in a longitudinal direction will be described. In this case, a pixel adjacent to an interpolation object position a2 in a longitudinal direction is provided as a center pixel, and an area including three horizontal pixels and three vertical pixels may be defined as a reference area. Two pixels adjacent to an interpolation object position a2 in a longitudinal direction are provided, so two reference areas are extracted, as illustrated in FIGS. 21A and 21B.

Then, an interpolation object position a3 adjacent to four adjacent pixels in a diagonal direction will be described. In this case, a pixel adjacent to an interpolation object position a3 in a diagonal direction is provided as a center pixel, and an area including three horizontal pixels and three vertical pixels may be defined as a reference area. Four pixels adjacent to an interpolation object position a3 in a diagonal direction are provided, so four reference areas are extracted, as illustrated in FIGS. 22A to 22D.

When a reference area is extracted, a selection unit 13 calculates a maximum value and a minimum value of a reference area, and may determine whether a center pixel value of a reference area is the maximum value or the minimum value (S5-2). Here, when the center pixel value of the reference area is the maximum value or the minimum value and a difference with a surrounding pixel value is significant, it may be determined that a center pixel is an acnode, e.g. an isolated point. Thus, when a reference area is satisfied with a condition of S5-2, it may be additionally satisfied with conditions below (S5-3). Herein, a is a constant setting value, e.g. a real number or a real number between 0 and 1, which may be dynamically determined, or alternatively, predetermined.

When a center pixel value of a reference area is a maximum value:

[center pixel value]>(([maximum value]−[minimum value])/2+[minimum value])×α

When a center pixel value of a reference area is a minimum value:

[center pixel value]<(([maximum value]−[minimum value])/2+[minimum value])/α

When a reference area is satisfied with a condition of S5-2 and a condition of S5-3, a selection unit 13 may select a second interpolation method (S5-4). Moreover, when a reference area is not satisfied with one of a condition of S5-2 or a condition of S5-3, the selection unit may select a first interpolation method (S5-5). When a second interpolation method is selected in at least one among a plurality of extracted reference areas, the selection unit 13 may select the second interpolation method.

When a pixel to be interpolated is an acnode, it may be required or desired to be an acnode in a magnified image. However, in a first interpolation method emphasizing/suitable for a high-band/high frequency, an acnode and a pixel adjacent to the acnode are mixed, so a problem may occur. In an example, it may be determined whether an interpolation object position is adjacent to an acnode. In the case of the acnode, a second interpolation method in which pixels are mixed may be selected. Thus, an acnode may be magnified as it is.

Figure 23:
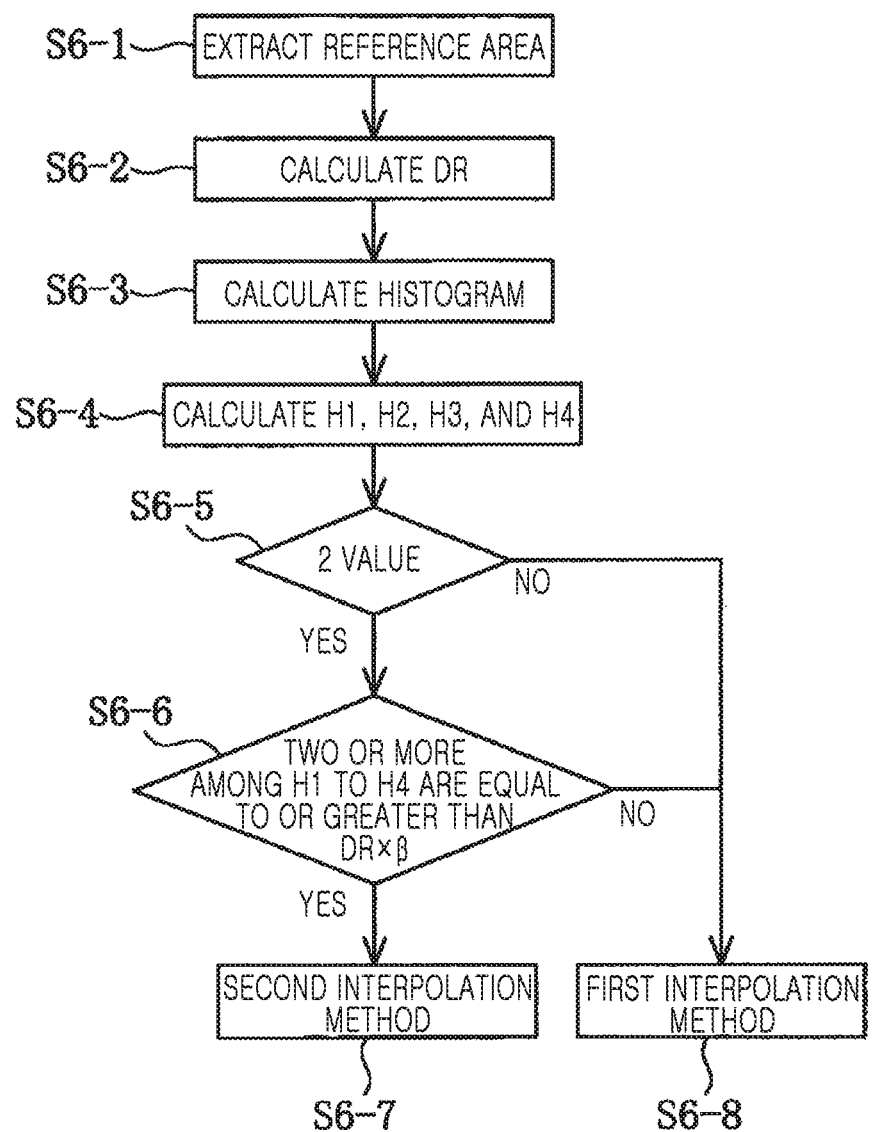
FIG. 23 is a flow chart provided to illustrate selection of an interpolation method according to some example embodiments.
Figure 24A:
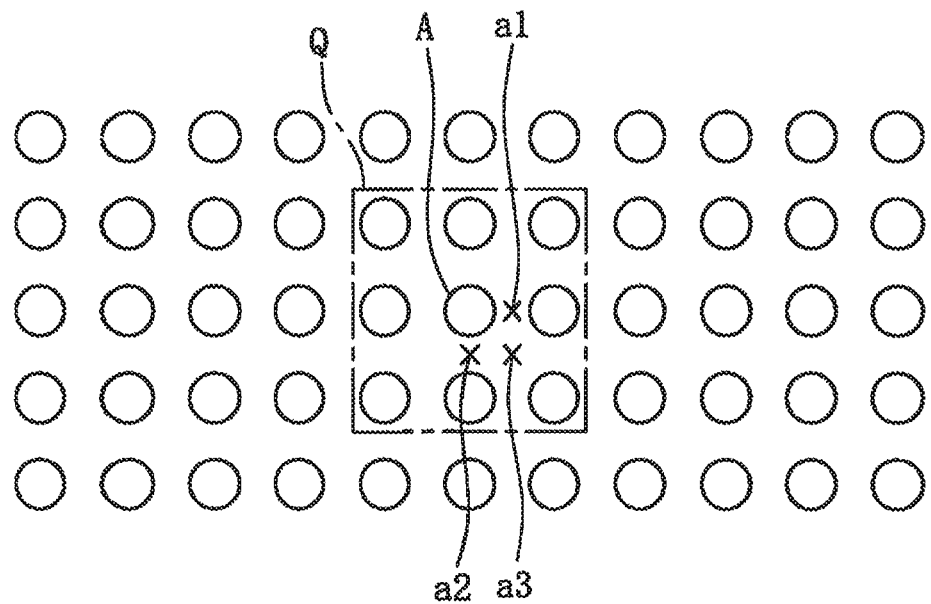
FIGS. 24A and 24B are schematic drawing illustrating contents of an operation performed on a reference area, according to some example embodiments.
Figure 24B:
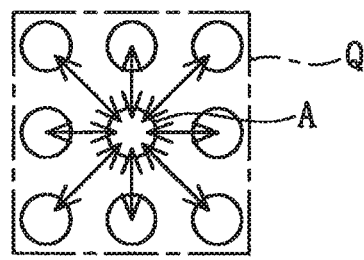

FIG. 23 is a flow chart provided to illustrate selection of an interpolation method according to example embodiments. FIGS. 24A and 24B are schematic drawings illustrating contents of an operation performed on a reference area, according to example embodiments.

Then, example embodiments will be described. A configuration of an image magnifying apparatus 1 according to the example may be similar to that according to the first example. In an example, the selection unit 13 may determine whether a line of a character is present around an interpolation object position.

In the example, the first interpolation method may be or include a bicubic method, and/or a Lanczos method. However, the first interpolation method is not limited thereto, and may be or include other interpolation methods emphasizing a high-band. Meanwhile, in the example, the second interpolation method may be or include a nearest-neighbor method. However, the second interpolation method is not limited thereto, and may be or include other interpolation methods emphasizing a high-band.

Referring to FIG. 23, selection of an interpolation method according to an example will be described. The selection unit 13 may extract a reference area from a periphery of an interpolation object position, first (S6-1). As illustrated in FIG. 24A, a reference area is an area in which a pixel A to be interpolated is provided as a center pixel, and including eleven pixels in a lateral direction and five pixels in a longitudinal direction. Moreover, as each of eight neighboring pixels, adjacent to the pixel A in lateral, longitudinal, and diagonal directions, is provided as a center pixel, eight reference areas the same as each other may be extracted.

Then, the selection unit 13 may calculate a difference value DR between a maximum value and a minimum value of a reference area (S6-2). Moreover, the selection unit 13 may calculate a histogram of the reference area (S6-3). Again, the selection unit 13 may select a central region Q having three horizontal pixels and three vertical pixels based on a center pixel, from a reference area. Moreover, as illustrated in FIG. 24B, the selection unit 13 may calculate a difference value between pixel values of a center pixel and an adjacent pixel, in the central region Q. Here, the selection unit 13 may calculate the sum H1 of an absolute difference value between pixels in a lateral direction including a center pixel of the central region Q. Moreover, the selection unit 13 may calculate the sum H2 of an absolute difference value between pixels in a longitudinal direction including a center pixel of the central region Q. Again, the selection unit 13 may calculate the sum H3 of an absolute difference value of a center pixel of the central region Q, with a pixel in a diagonal direction, including an upper left pixel with respect to the center pixel. Moreover, the selection unit 13 may calculate the sum H4 of an absolute difference value of a center pixel of the central region Q, with a pixel in a diagonal direction, including a lower right pixel with respect to the center pixel (S6-4).

The selection unit 13 may determine whether two reference areas are provided, from the histogram of the reference area calculated in S6-3 (S6-5). An adjacent area to a line of a character may indicate that a pixel value is a binary value. In this regard, in S6-5, it may be determined whether an adjacent area to a pixel A to be interpolated is an adjacent area to a line of a character.

When it is determined that the reference area is a binary value in S6-5, the selection unit 13 may determine that two or more among four values of H1 to H4 are greater than or equal to DR×β (S6-6). β is a constant setting value, e.g. a real number. B may be determined dynamically, or alternatively, may be predetermined. In an example, it is assumed that β=1.5. However, it is not limited thereto, and β may be selected as arbitrary real number of 1<β<2. Thus, it may be determined that a center pixel of a reference area is located on a line of a character.

When a reference area is satisfied with a condition of S6-6, a selection unit 13 may select a second interpolation method (S6-7). Moreover, when a reference area is not satisfied with a condition of S6-5 or a condition of S6-6, the selection unit 13 may select a first interpolation method (S6-8). Nine reference areas are extracted as described above. When a second interpolation method is selected in one reference area among the nine reference areas, a second interpolation method is selected. When a first interpolation method is selected in all reference areas, a first interpolation method is selected.

In an image, when a character is indicated by a sharp line, it is required or desired to indicate the character by a sharp line in a magnified image. When a line of a character is magnified using a first interpolation method emphasizing a high-band, it is mixed with a pixel around the character, so a line becomes blurred. In an example, it may be determined whether an interpolation object position is a line of a character.

In the case of the line of a character, a second interpolation method in which pixels are mixed may be selected. Thus, while a sharpened state of the line of a character is maintained, an image may be magnified.

Moreover, when a single reference area is provided, it may be misinterpreted in an end portion of a line of a character, or the like. Here, with respect to eight pixels adjacent to a pixel to be interpolated, a reference area in which each of eight pixels is provided as a center pixel may be extracted. Thus, the end portion of the line of the character may be reliably determined.

As set forth above, according to some example embodiments of inventive concepts, an image magnifying apparatus capable of outputting a magnified image having a high image quality while suppressing unnaturalness, by selecting an interpolation method suitable according to local characteristics of an input image.

While example embodiments have been shown and described above, it will be apparent to those skilled in the art that modifications and variations could be made without departing from the scope of the present disclosure, as defined by the appended claims.

What is claimed is:

1. An image magnifying apparatus configured to receive image data including a plurality of pixels arranged in a lattice, and output magnified image data by applying an interpolation method to the image data, the image magnifying apparatus comprising:
   a processor configured to execute non-transitory machine readable instructions to configure the processor to,
   receive the image data,
   generate a first interpolation pixel between pixels of the image data, by applying a first interpolation method based on a high-band spectrum of the image data,
   generate a second interpolation pixel between pixels of the image data, by applying a second interpolation method not based on the high-band spectrum of the image data,
   identify a pattern of pixels of the image data by extracting peripheral pixels of an interpolation object position in the image data,
   select whether to apply the first interpolation method to the interpolation object position or whether to apply the second interpolation method to the interpolation object position, and
   output one of the first interpolation pixel and the second interpolation pixel, as an output interpolation pixel, based on the selection, wherein
   the second interpolation method includes a nearest-neighbor method,
   the processor is configured to extract (i) a widthwise reference area including six pixels in a lateral direction and two pixels in a longitudinal direction from a periphery of the interpolation object position, or (ii) a lengthwise reference area including two pixels in a lateral direction and six pixels in a longitudinal direction, from the periphery of the interpolation object position, and the processor is configured to select the second interpolation method, in response to at least one of (i) a first condition in which pixel values in two rows in a long side direction of the reference area are monotonically increased or monotonically decreased in one direction, (ii) a second condition in which pixel values in six groups in a short side direction of the reference area are increased or decreased in one direction, and (iii) a third condition in which a sum of difference values between adjacent pixels in the reference area is less than or equal to a constant setting value.

2. The image magnifying apparatus of claim 1, wherein the processor is configured to extract a plurality of reference areas, the plurality of reference areas not overlapping each other, and select the second interpolation method, in response to one among the first condition, the second condition, and the third condition being satisfied by one among the plurality of reference areas.

3. The image magnifying apparatus of claim 1, wherein the second interpolation method includes at least one of a nearest-neighbor method or a bilinear method.

4. An image magnifying apparatus configured to receive image data including a plurality of pixels arranged in a lattice, and output magnified image data by applying an interpolation method to the image data, the image magnifying apparatus comprising:

a processor configured to execute non-transitory machine readable instructions to configure the processor to, receive the image data, generate a first interpolation pixel between pixels of the image data, by applying a first interpolation method based on a high-band spectrum of the image data, generate a second interpolation pixel between pixels of the image data, by applying a second interpolation method not based on the high-band spectrum of the image data, identify a pattern of pixels of the image data by extracting peripheral pixels of an interpolation object position in the image data, select whether to apply the first interpolation method to the interpolation object position or whether to apply the second interpolation method to the interpolation object position, and output one of the first interpolation pixel and the second interpolation pixel, as an output interpolation pixel, based on the selection, wherein the second interpolation method includes a nearest-neighbor method, the processor is configured to extract a widthwise reference area including six pixels in a horizontal direction and two pixels in a vertical direction from a periphery of the interpolation object position, or a lengthwise reference area including two pixels in a horizontal direction and six pixels in a vertical direction, from the periphery of the interpolation object position, and the selection is configured to select the second interpolation method, in response to both of a first condition and a second condition being satisfied, wherein the first condition includes a difference value between pixels adjacent in a diagonal direction within the reference area being less than or equal to a constant setting value, and the second condition being that a difference value between pixels in two groups in a short side direction while being located in the center of the reference area in a long side direction is greater than or equal to a constant setting value.

5. The image magnifying apparatus of claim 4, wherein the processor is configured to extract the widthwise reference area in which a left pixel of the interpolation object position is located in an upper left end as a first lateral direction reference area, extracts second to sixth lateral direction reference areas shifted leftward by a single pixel from the first lateral direction reference area, and extracts seventh to twelfth lateral direction reference areas, in which the first to sixth lateral direction reference areas are shifted by a single pixel upwardly, respectively, in response to the interpolation object position being adjacent to two left and right pixels in a lateral direction, the processor is configured to extract the lengthwise reference area in which an upper pixel of the interpolation object position is located in an upper left end as a first longitudinal direction reference area, extracts second to sixth longitudinal direction reference areas shifted by a single pixel upwardly from the first longitudinal direction reference area, and extracts seventh to twelfth longitudinal direction reference areas, in which the first to sixth longitudinal direction reference areas are shifted leftward by a single pixel, respectively, in response to the interpolation object position is adjacent to two upper and lower pixels in a longitudinal direction, the processor is configured to determine an upper left pixel of the interpolation object position as a location of an upper left end, and to extract the first to sixth lateral direction reference areas, the seventh to twelfth lateral direction reference areas, the first to sixth longitudinal direction reference areas, and the seventh to twelfth longitudinal direction reference areas, in response to the interpolation object position being adjacent to four of upper, lower, left, and right pixels in a diagonal direction, and the processor is configured to select the second interpolation method, in response to at least one among the plurality of reference areas being satisfied with respect to at least one of the first condition or the second condition.

6. The image magnifying apparatus of claim 4, wherein the second interpolation method includes a nearest-neighbor method.

7. An image magnifying apparatus configured to receive image data including a plurality of pixels arranged in a lattice, and output magnified image data by applying an interpolation method to the image data, the image magnifying apparatus comprising:

a processor configured to execute non-transitory machine readable instructions to configure the processor to, receive the image data, generate a first interpolation pixel between pixels of the image data, by applying a first interpolation method based on a high-band spectrum of the image data, generate a second interpolation pixel between pixels of the image data, by applying a second interpolation method not based on the high-band spectrum of the image data, identify a pattern of pixels of the image data by extracting peripheral pixels of an interpolation object position in the image data, select whether to apply the first interpolation method to the interpolation object position or whether to apply the second interpolation method to the interpolation object position, and output one of the first interpolation pixel and the second interpolation pixel, as an output interpolation pixel, based on the selection, wherein the second interpolation method includes a nearest-neighbor method, the processor is configured to extract a reference area having three horizontal pixels and three vertical pixels, in which a pixel adjacent to the interpolation object position is provided as a center pixel, and the processor is configured to calculate a maximum value and a minimum value of nine pixels included in the reference area, and select the second interpolation method, in response to a condition of the center pixel value of the reference area being the maximum value and [center pixel value]>(([maximum value]−[minimum value])/2+[minimum value])×α, or a center pixel value of the reference area is the minimum value and [center pixel value]<(([maximum value]−[minimum value])/2+[minimum value])/α, with respect to a constant value α.

8. The image magnifying apparatus of claim 7, wherein the processor is configured to extract a first reference area in which a left pixel with respect to the interpolation object position is provided as a center pixel, and a second reference area in which a right pixel with respect to the interpolation object position is provided as a center pixel, in response to the interpolation object position being adjacent to two left and right pixels in a lateral direction, the processor is configured to extract a first reference area in which an upper pixel with respect to the interpolation object position is provided as a center pixel, and a second reference area in which a lower pixel with respect to the interpolation object position is provided as a center pixel, in response to the interpolation object position being adjacent to two upper and lower pixels in a longitudinal direction, the processor is configured to extract a first reference area in which an upper left pixel with respect to the interpolation object position is provided as a center pixel, a second reference area in which an upper right pixel with respect to the interpolation object position is provided as a center pixel, a third reference area in which a lower left pixel with respect to the interpolation object position is provided as a center pixel, and a fourth reference area in which a lower right pixel with respect to the interpolation object position is provided as a center pixel, when the interpolation object position is adjacent to four of upper, lower, left, and right pixels in a diagonal direction, and the processor is configured to select the second interpolation method, in response to one among the plurality of reference areas is satisfied with the condition.

9. The image magnifying apparatus of claim 7, wherein the second interpolation method includes a nearest-neighbor method.

\* \* \* \* \*